United States Patent
Whisenant

(10) Patent No.: US 8,723,679 B2
(45) Date of Patent: May 13, 2014

(54) SYSTEMS AND METHODS FOR TRANSMITTING ALERT MESSAGES RELATING TO EVENTS THAT OCCUR WITHIN A PRE-DEFINED AREA

(75) Inventor: Greg Whisenant, Salt Lake City, UT (US)

(73) Assignee: Public Engines, Inc., Draper, UT (US)

( * ) Notice: Subject to any disclaimer, the term of this patent is extended or adjusted under 35 U.S.C. 154(b) by 490 days.

(21) Appl. No.: 12/787,276

(22) Filed: May 25, 2010

(65) Prior Publication Data

US 2011/0291851 A1 Dec. 1, 2011

(51) Int. Cl.
*G08B 21/00* (2006.01)

(52) U.S. Cl.
USPC ............... 340/686.1; 340/539.1; 340/539.13; 340/539.2

(58) Field of Classification Search
USPC ........................................... 340/686.1
See application file for complete search history.

(56) References Cited

U.S. PATENT DOCUMENTS

| | | | |
|---|---|---|---|
| 7,696,868 B1 * | 4/2010 | Emigh | 340/539.13 |
| 8,045,954 B2 * | 10/2011 | Barbeau et al. | 455/404.1 |
| 2004/0207522 A1 * | 10/2004 | McGee et al. | 340/539.13 |
| 2007/0040895 A1 * | 2/2007 | Barbeau et al. | 348/14.01 |
| 2007/0109114 A1 * | 5/2007 | Farley et al. | 340/506 |
| 2007/0299749 A1 * | 12/2007 | Lovell, Jr. | 705/28 |
| 2008/0272884 A1 * | 11/2008 | Lovell | 340/7.61 |
| 2010/0289640 A1 * | 11/2010 | Annamalai | 340/539.13 |
| 2011/0045847 A1 * | 2/2011 | Roin et al. | 455/456.3 |
| 2012/0126974 A1 * | 5/2012 | Phillips et al. | 340/539.13 |

* cited by examiner

*Primary Examiner* — Travis Hunnings
(74) *Attorney, Agent, or Firm* — Kunzler Law Group

(57) ABSTRACT

A computer-implemented method for receiving alert messages relating to events that occur within a pre-defined area is described. The user interface for a reporting application is provided. A map associated with a location of a user is displayed. A neighborhood is created according to input received from the user via the user interface. An alert message regarding an occurrence of an event within the neighborhood is received. Information is displayed on the map that relates to the location of the occurrence of the event.

20 Claims, 16 Drawing Sheets

SYSTEMS AND METHODS FOR TRANSMITTING ALERT MESSAGES RELATING TO EVENTS THAT OCCUR WITHIN A PRE-DEFINED AREA

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often requires human and computer interaction. Users of computer technologies continue to demand that the efficiency of these technologies increase. Improving the efficiency of computer technologies may be desirable to anyone who uses and relies on computers.

Computing systems may be used to transfer data from one user to another user. Computing technologies may also be used to transmit data from a government agency to one or more citizens. These technologies allow citizens to receive current and up to date information. Examples of the types of data that may be transmitted may include voter registration information, vehicle registration information, census information, and the like.

Law enforcement agencies may also desire to provide information to citizens regarding the security of a particular area. For example, information stored in databases of these agencies may be served on a website so that citizens may access the website and view the information. This information may include data relating to crimes that have occurred in a particular area. Benefits may be realized by providing systems and methods for transmitting alert messages relating to certain events to one or more citizens. Benefits may also be realized by providing systems and methods that analyze and the information and generate analytical data regarding these occurrences.

SUMMARY

According to at least one embodiment, a computer-implemented method for receiving alert messages relating to events that occur within a pre-defined area is described. The user interface for a reporting application is provided. A map associated with a location of a user is displayed. A neighborhood is created according to input received from the user via the user interface. An alert message regarding an occurrence of an event within the neighborhood is received. Information is displayed on the map that relates to the location of the occurrence of the event.

In one example, the alert message may be received as a short messaging service (SMS) message. In another example, the alert message may be received as an electronic mail message. The alert message may include an identifier to identify the alert message as an emergency message. Alternatively, the alert message may include an identifier to identify the alert message as a non-emergency message.

In one example, a verification for the user may be received from a second user. The occurrence of the event may indicate an occurrence of a crime within the boundaries of the neighborhood. A tip relating to the occurrence of an event may be sent. In one example, the tip is sent as an SMS message. The tip may be sent to a member of a law enforcement agency.

A computing device configured to receive alert messages relating to events that occur within a pre-defined area is also described. The device may include a processor and memory in electronic communication with the processor. The device may further include a user interface module configured to display a map associated with a location of a user, and create a neighborhood according to input received from the user via the user interface. The user interface module may be further configured to receive an alert message regarding an occurrence of an event within the neighborhood, and display information on the map that relates to the location of the occurrence of the event.

A computer-program product for receiving alert messages relating to events that occur within a pre-defined area is also described. The computer-program product may include a computer-readable medium having instructions thereon. The instructions may include code programmed to provide a user interface to a reporting application, and code programmed to display a map associated with a location of a user. The instructions may further include code programmed to create a neighborhood according to input received from the user via the user interface, and code programmed to receive an alert message regarding an occurrence of an event within the neighborhood. The instructions may also include code programmed to display information on the map that relates to the location of the occurrence of the event.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
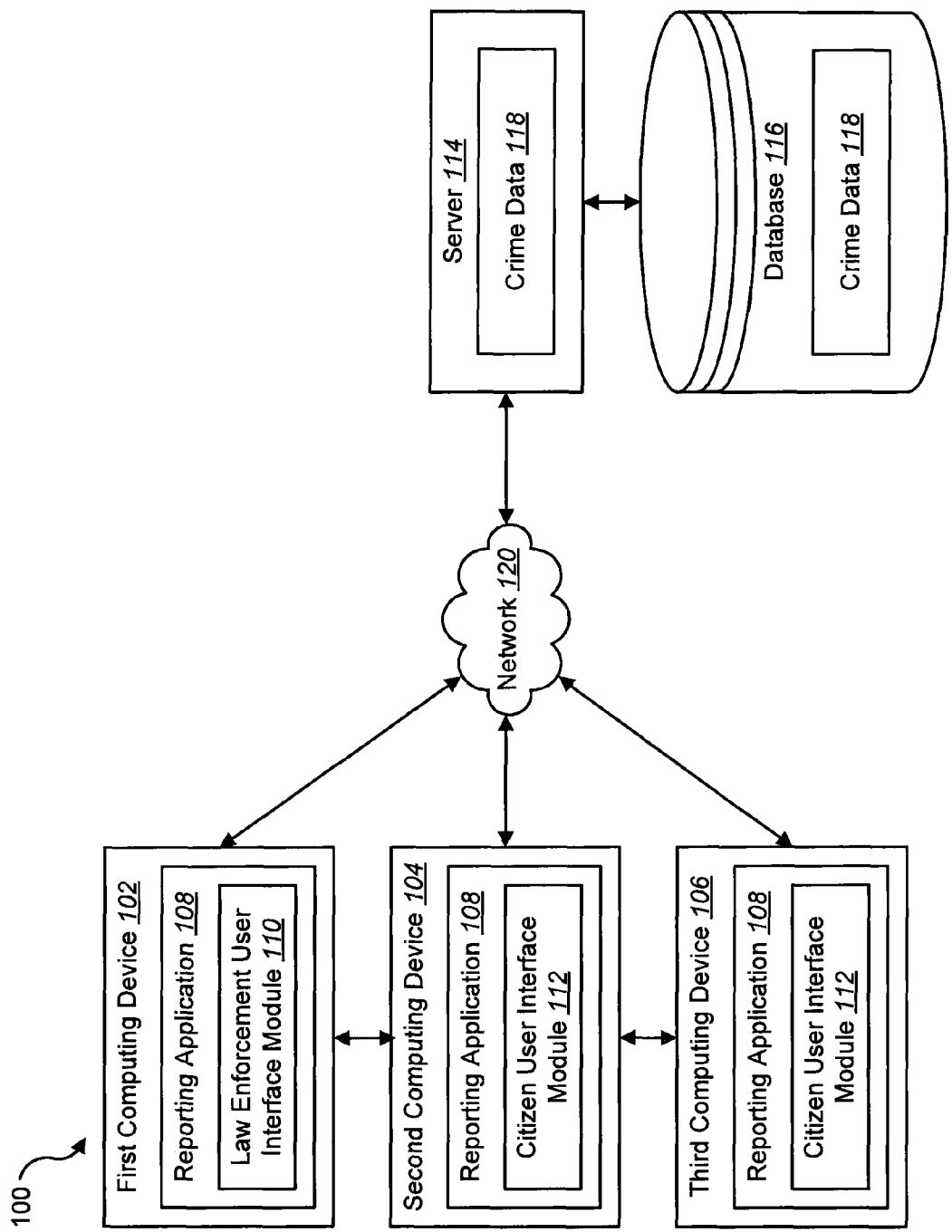
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

FIG. 1 is a block diagram illustrating one embodiment of an environment 100 in which the present systems and methods may be implemented. In one example, a plurality of computing devices 102, 104, 106 may communicate with each other and with a server 114 across a network connection 120.

The computing devices 102, 104, 106 may be a personal computer (PC), a laptop, a personal digital assistant (PDA), a mobile communications device, or any other type of computing device. In one embodiment, at least one computing device 102, 104, 106 may include a reporting application 108. The reporting application 108 may be executed on the computing device 102, 104, 106 via a web browser application. In one example, the reporting application 108 may allow a user of a computing device to report information regarding a certain event (or events) to another user of another computing device. In one configuration, the reporting application 108 may allow a user to report crime information for a particular area to another user. For example, a user may enter crime information for a certain neighborhood via the reporting application 108. Other users may access this information via the reporting application 108.

In one embodiment, a first computing device 102 may execute the reporting application 108. The reporting application 108 executing on the first computing device 102 may include a law enforcement user interface module 110. The module 110 may be designed to interface with members of a law enforcement agency, such as a police agency. A member of the law enforcement agency may interface with the reporting application 108 via the module 110 to send crime information to other users interfacing with the reporting application 108. The crime information may be sent via electronic mail, short message service (SMS) messages, and the like.

A user that is not a member of a law enforcement agency may be referred to herein as a citizen. In one example, a citizen may interface with the reporting application 108 via a citizen user interface module 112. The module 112 may allow the citizen to receive crime information from other citizens and members of a law enforcement agency via the reporting application 108. Details regarding the reporting application 108, the law enforcement user interface module 110, and the citizen user interface module 112 will be described below.

In one configuration, the server 114 may retrieve and store crime data 118 in a database 116. The reporting application 108 may receive and send crime data 118 from the server 114. Crime data 118 received by the server 114 may be stored in the database 116. The server 114 may retrieve crime data 118 from the database upon a request from the reporting application 108.

Figure 2:
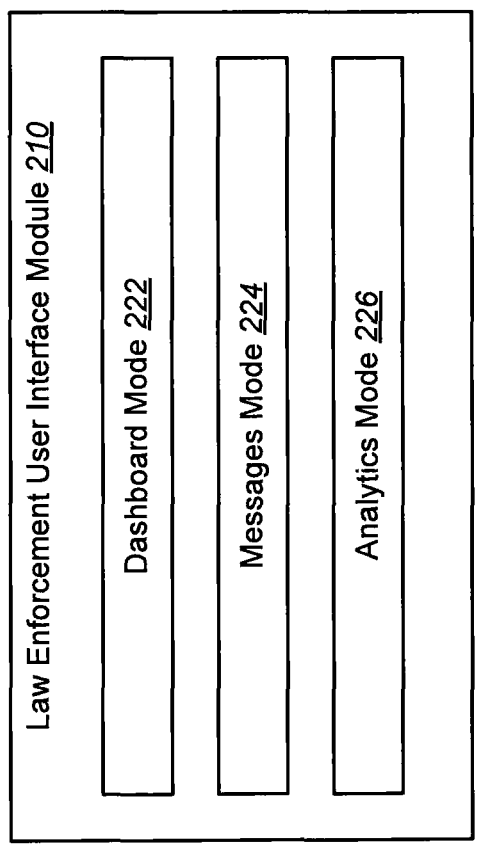
FIG. 2 is a block diagram illustrating one embodiment of a law enforcement user interface module.

FIG. 2 is a block diagram illustrating one embodiment of a law enforcement user interface module 210. In one configuration, the module 210 may allow a member of a law enforcement agency to interface with the reporting application 108. The module 210 may include a dashboard module 222, a messages mode 224, and an analytics mode 226. Each of these modes 222, 224, 226 will be described below.

Figure 3:
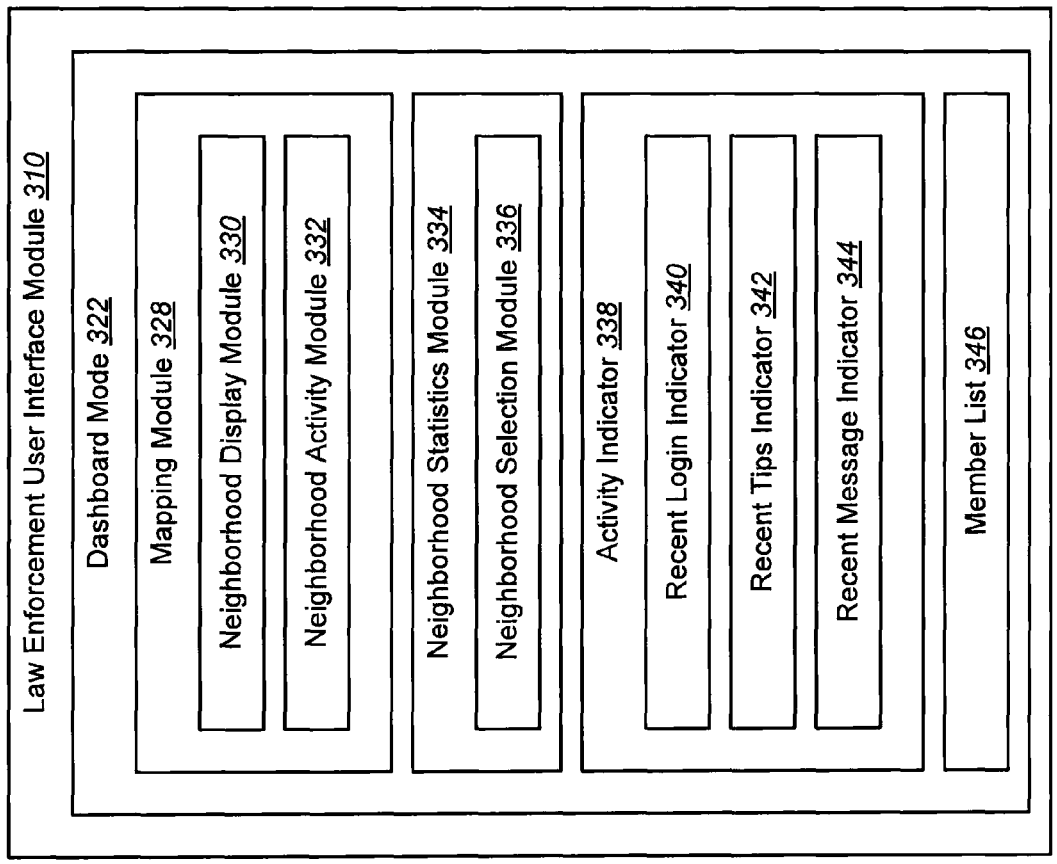
FIG. 3 is a block diagram illustrating one configuration of a law enforcement user interface module that is set in a dashboard mode.

FIG. 3 is a block diagram illustrating one configuration of a law enforcement user interface module 310 that is set in a dashboard mode 322. The dashboard mode 322 may include a mapping module 328. The mapping module 328 may include a neighborhood display module 330. The neighborhood display module 330 may display a map of a particular area, such as a jurisdiction of a law enforcement agency. In one example, the location of the law enforcement agency may be located at the center of the displayed map.

The neighborhood display module 330 may display one or more shapes that indicate the boundaries of one or more neighborhoods. In one example, all neighborhood shapes may be displayed by default. A neighborhood activity module 332 may cause the color of each shape to vary. The color of a neighborhood shape may indicate the activity level of the neighborhood. The activity level of a neighborhood may be determined by the amount of crime information that is reported by citizens for the neighborhood, the number of citizens of a neighborhood that use the reporting application 108, the number of logins to the reporting application 108, the number of messages sent, the number of verifications of citizens, etc. In one embodiment, the mapping module 328 may include a key that is displayed on the map. The key may indicate which color corresponds to a particular activity level. Icons representing certain events that have occurred (such as crimes) may also be shown on the map over the top of the neighborhood shapes.

A neighborhood statistics module 334 may generate statistics that indicate the total number of neighborhoods touching the jurisdiction, number of citizens within the jurisdiction that use the reporting application 108, the number of alerts those citizens are signed up for, and the like. The module 334 may also include a neighborhood selection module 336 that allows a member of the law enforcement agency to select a particular neighborhood within the jurisdiction. The user may change which neighborhoods (and the associated maps and other information) are displayed in the dashboard 322. The user may click a select neighborhoods link provided by the selection module 336. A list of available neighborhoods in the jurisdiction may appear and the user may select or deselect neighborhoods from the list. When a specific neighborhood is selected, the mapping module 328, the statistics module 334, and information associated with an activity indicator 338 may be updated to display the corresponding data for the selected neighborhood.

The dashboard mode 322 may also include an activity indicator 338. The activity indicator 338 may include a recent login indicator 340 that may indicate the number of citizens in each neighborhood who have logged into the reporting application 108 in a certain time period. For example, the recent login indicator 340 may indicate the number of citizens that have logged into the application 108 within the past week. A recent tips indicator 342 may indicate the number of crime tips that have been received from citizens of a particular neighborhood in a certain time period. In addition, a recent message indicator 344 may indicate the number of messages sent by citizens of each neighborhood (either to other citizens or to the law enforcement agency) in a certain time period. In one embodiment, the data indicated by the various indicators 340, 342, 344 may be displayed to a user in a graphical format.

In one embodiment, the dashboard mode 322 may also include a member list 346. The list 346 may include the most active members from all neighborhoods shown via the neighborhood display module 330. The list 346 may display the members in order of activity. The activity level of the members may be based on the number of logins by the member, the last login of the member, verification level of the member, the number of verifications given by the member, the number of messages sent by the member, etc. In one embodiment, the member list 346 may display the name of the member, the neighborhood to which that member belongs, and last login to the reporting application 108 by the member.

Figure 4:
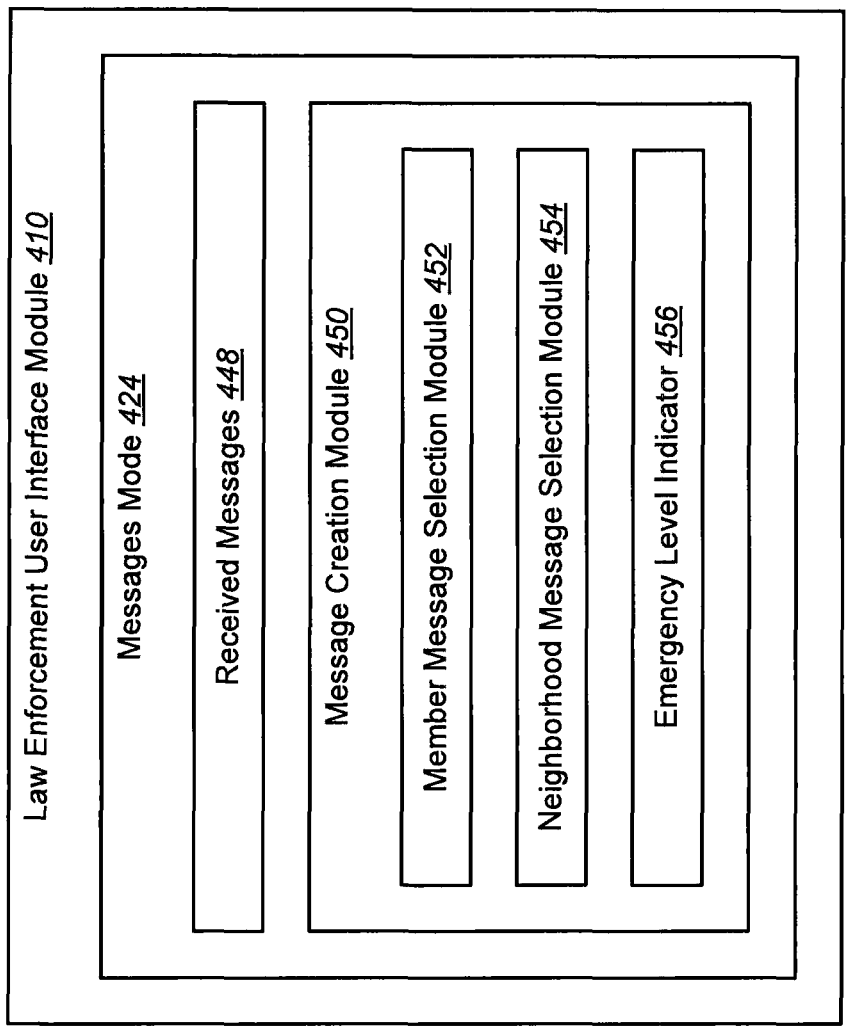
FIG. 4 is a block diagram illustrating one configuration of a law enforcement user interface module in a messages mode.

FIG. 4 is a block diagram illustrating one configuration of a law enforcement user interface module 410 in a messages mode 424. The messages mode 424 may allow a member of a law enforcement agency to manage messages received from neighborhoods in the jurisdiction of the law enforcement agency, and to send messages to users (citizens) in this jurisdiction.

In one example, the messages mode 424 may include received messages 448. The received messages 448 may include messages received from individual citizens of a particular neighborhood, crime tips received from individual citizens, etc. In one embodiment, received messages that have been unread may be indicated by a certain color, icon, or other type of indicator. The received messages 448 may be deleted, sorted by date, neighborhood or sender, searched by keyword, and the like. Each received message may display the sender's name, subject line, first line of the message, etc. If the received message 448 is a crime tip, the received message 448 may display the tip, the neighborhood associated with the tip, the first line of the tip, and the like.

The messages mode may include a message creation module 450 to allow a user (such as a member of a law enforcement agency) to create a message to send to at least one other user (or citizen) of the reporting application 108. In one embodiment, a member of the law enforcement agency may either begin typing another users' name in a "To" field. In addition, a member message selection module 452 may allow the member to select other members from a list. Further, a neighborhood message selection module 454 may allow the member to select a neighborhood from a map to send the message to all members in that neighborhood. Messages may be sent via email, as SMS messages (i.e., text messages), and the like. As a result, the recipient may use any type of computing device to receive the messages In one example, the message creation module 450 may include an emergency level indicator 456. The emergency level indicator 456 may allow the creator of the message to identify the message as either an emergency message or a non-emergency message. The message may also include an attachment, if desired. In one configuration, messages identified as emergency messages may include a type of indicator, such as, but not limited to, an icon or type of symbol to indicate to the recipient that the message has been flagged as an emergency message. A non-emergency message may also be associated with a type of indicator. For example, non-emergency messages may include, but are not limited to, a logo of the law enforcement agency. As a result, the recipient may quickly identify whether a received message from a member of a law enforcement agency is an emergency message or a non-emergency message.

Figure 5:
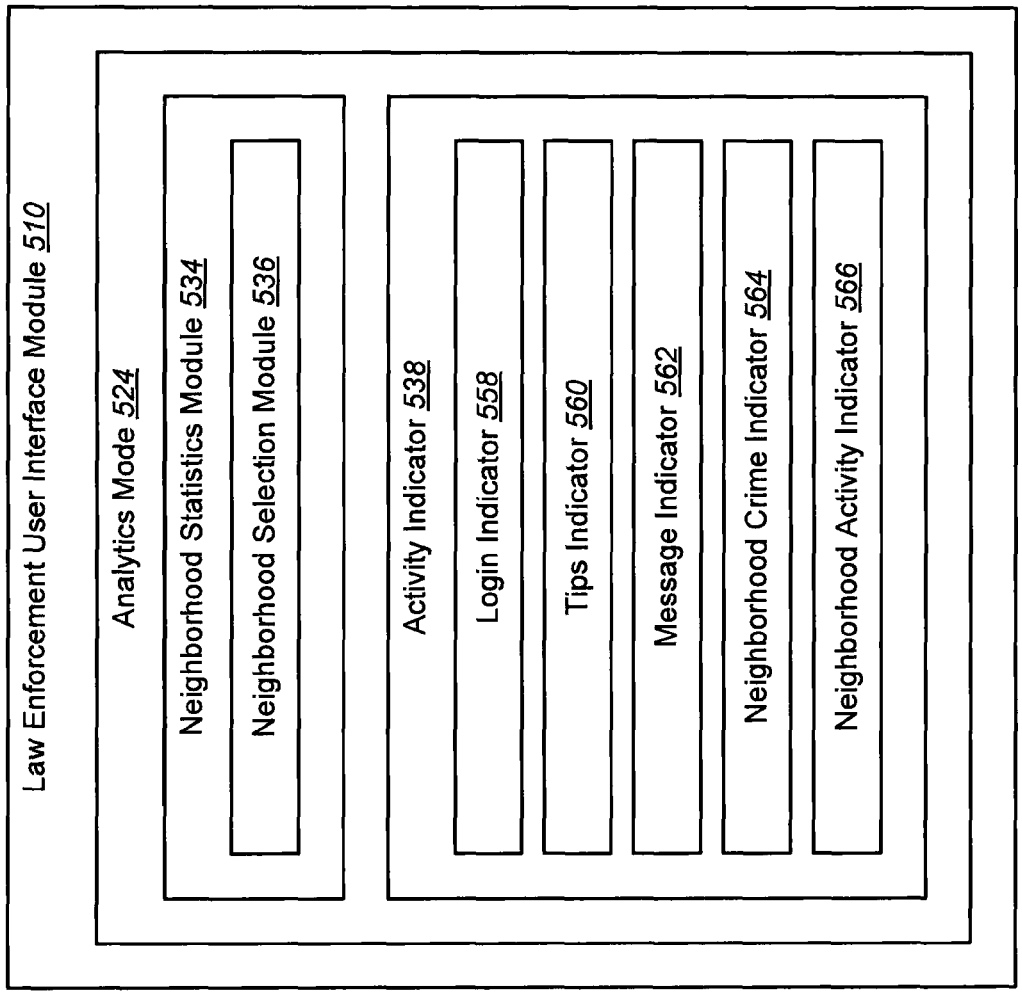
FIG. 5 is a block diagram illustrating one embodiment of a law enforcement user interface module in an analytics mode.

FIG. 5 is a block diagram illustrating one embodiment of a law enforcement user interface module 510 in an analytics mode 524. The analytics mode 524 may include a neighborhood statistics module 534. The statistics module 534 may display various statistics associated with a particular neighborhood (e.g., number of members in the neighborhood, number of crime tips received from members of the neighborhood, etc.). The statistics (or analytics) may be displayed graphically to the user.

The neighborhood statistics module 534 may include a neighborhood selection module 536 that may allow a user to select one or more neighborhoods to include in the analytics. When multiple neighborhoods are selected, a separate set of charts or graphs are displayed for each selected neighborhood. In one embodiment, the user may select a date range to display the analytics for the selected neighborhoods.

The analytics mode 524 may further include an activity indicator 538. The indicator 538 may provide information regarding the activity of certain events. For example, a login indicator 558 may provide a graph that displays the total number of members logged into the reporting application 108. In addition, the login indicator 558 may display the number of unique users logged in. A tips indicator 560 may provide statistics that relate to the number of crime tips received from users in a particular neighborhood, the number of crime tips received from all users, and the like.

In one embodiment, the activity indicator 538 may also include a message indicator 562. The message indicator 562 may provide data that indicate the difference between the number of messages sent and the number of users to whom the messages are being sent. The message indicator 562 may also provide data that indicate the number of unique users sending messages and the unique number of users receiving messages.

The activity indicator 538 may further include a neighborhood crime indicator 564. The neighborhood crime indicator may indicate, for each neighborhood, the crime events that have occurred in the neighborhood. In one embodiment, this data may be provided in a graphical format. A neighborhood activity indicator 566 may indicate the number of tips sent from a particular neighborhood. For example, the tips may be in relation to crime, clearances, or other events occurring in the neighborhood. The neighborhood activity indicator 566 may also display the number of alerts in the neighborhood that users have registered to receive.

Figure 6:
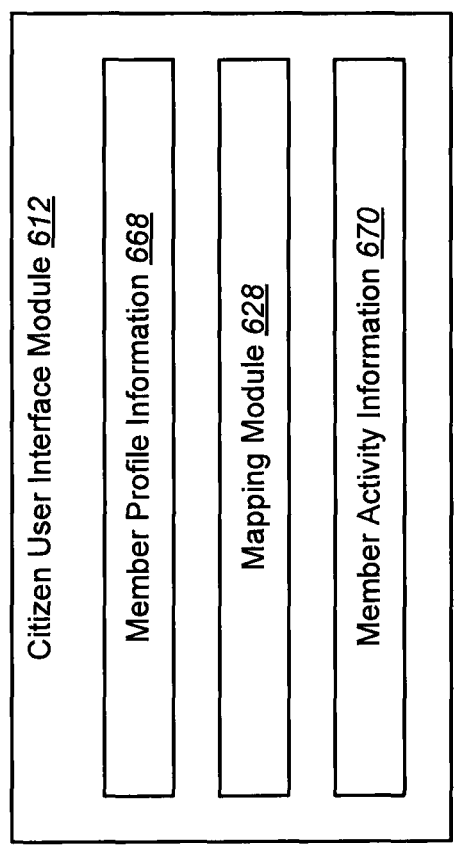
FIG. 6 is a block diagram illustrating one embodiment of a citizen user interface module.

FIG. 6 is a block diagram illustrating one embodiment of a citizen user interface module 612. As previously explained, the module 612 may allow a citizen to interface with the reporting application 108 to receive and send information relating to events occurring in a particular neighborhood, such as crime events. The information may be sent/received to/from a law enforcement agency. A member of the law enforcement agency may receive/send the events through the reporting application 108 via the law enforcement user interface module 110.

The citizen user interface module 612 may include member profile information 668, a mapping module 628, and a member activity information 670. In one embodiment, the member profile information 668 may display information that is specific to a particular user or member. The mapping module 628 (as will be described below) may display a functional map that may be centered over a user's default neighborhood (if the user is a member of a neighborhood). The mapping module 628 may further include a crime details widget that includes detailed information relating to events (such as crimes) that have occurred in an area represented by the displayed map. The crime details widget (explained below) may be minimized by default. The member activity information 670 may include a ticker-like window that may display relevant information, applicable to both the user and the neighborhood. Details regarding the member activity information 670 will also be described below.

Figure 7:
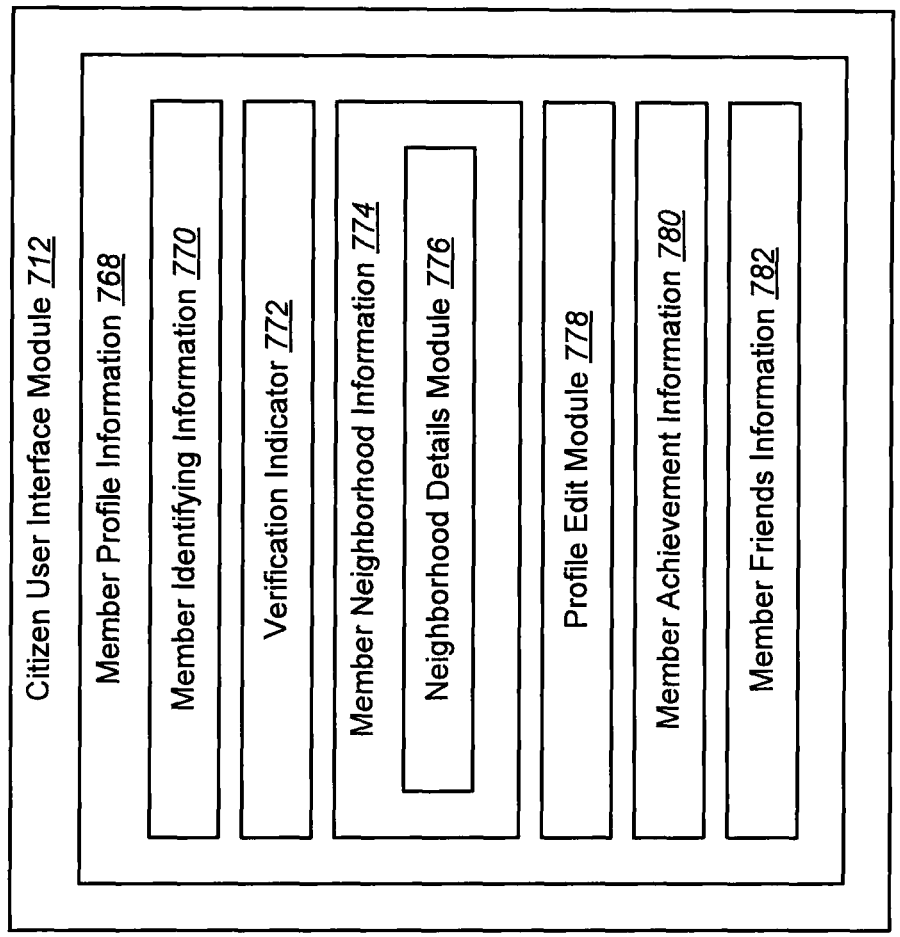
FIG. 7 is a block diagram illustrating one embodiment of a citizen user interface module that displays member profile information.

FIG. 7 is a block diagram illustrating one embodiment of a citizen user interface module 712 that displays member profile information 768. In order to access some of the information provided by the reporting application 108, a user logs in to the reporting application 108 via the module 712. For example, the user may provide a username and password via the module 712. As another example, the user may select to log in using another website. For example, the user may log in to the reporting application 108 by selecting a "Login with Facebook" request. The user may log into the reporting application 108 via his/her login credentials that are used to log into the website "Facebook". If the provided credentials are authenticated, the user may have access to the information provided by the reporting application 108 via the user interface module 712.

In one configuration, the member profile information 768 may include member identifying information 770. For example, the identifying information 770 may include the users' name, a photo of the user, etc. The profile information 768 may also include a verification indicator 772. The verification indicator 772 may indicate when the user has been "verified". The user may be verified by other users. The indicator 772 may also allow indicate to the user the other users that performed the verification for the user.

The member profile information 768 may further include member neighborhood information 774 that displays information relating to one or more neighborhoods associated with the user. The neighborhood information 774 may include a neighborhood details module 776. The details module 776 may display a hyperlink to a default neighborhood associated with the user. The user may click the link and details regarding the neighborhood may be displayed. Details regarding the neighborhood details module 776 will be described below.

In one embodiment, the neighborhood information 774 may also display a hyperlink that allows a user to change between neighborhoods. This may occur when the user joins two or more neighborhoods. The user may click one of the neighborhoods in a list and the mapping module 628 may shift to display the selected neighborhood. The user may select one of the neighborhoods to be the default neighborhood. The neighborhood information 774 may further include a "see all my neighborhoods" hyperlink. If a user clicks this link, a list of the neighborhoods associated with the user may be displayed.

In one configuration, the member profile information 768 may also include a profile edit module 778. The module 778 may allow the user to view a profile page of the user in an edit mode. For example, the user may add a profile photo to the member identifying information 770. The user may also edit a username and passwords associated with the user, a residential address, and other contact information.

The member profile information 768 may further include member achievement information 780. The achievements information 768 may display the achievements associated with the user based on the activity level of the user with regards to the reporting application 108. In one configuration, the user may earn achievements that may be represented as icons of pins and badges. The member achievement information 780 may display a list of all pins and badges a users has earned, from the most recent to the least recently earned. The achievement icon may include an identifier that indicates the nature of the achievement and a partial description of the achievement. The user may click on a particular achievement icon and an additional window may be displayed that includes a full description of the selected achievement icon.

The member achievement information 770 may also display achievements that the user is in the progress of earning. For example, the information 770 may display a list of pins and badges that the user has started but not yet finished. Further, the information 770 may display additional achievements that the user has not yet earned.

Member friends information 782 may display a list of individuals whom the user has "connected" with or whom the user has sent an invitation to connect with. The member friends information 782 may display a link that the user may click in order to highlight on the map where that particular friend lives. Further, the information 782 may display a verification link that the user may click to verify this particular friend. The user may also send messages to the friend as well as a request to for the friend to provide a verification of the user. The information 782 may further display achievement icons that the friend has earned. In addition, the information 782 may display a camera icon if the friend has registered a camera (such as a webcam, etc.).

Figure 8:
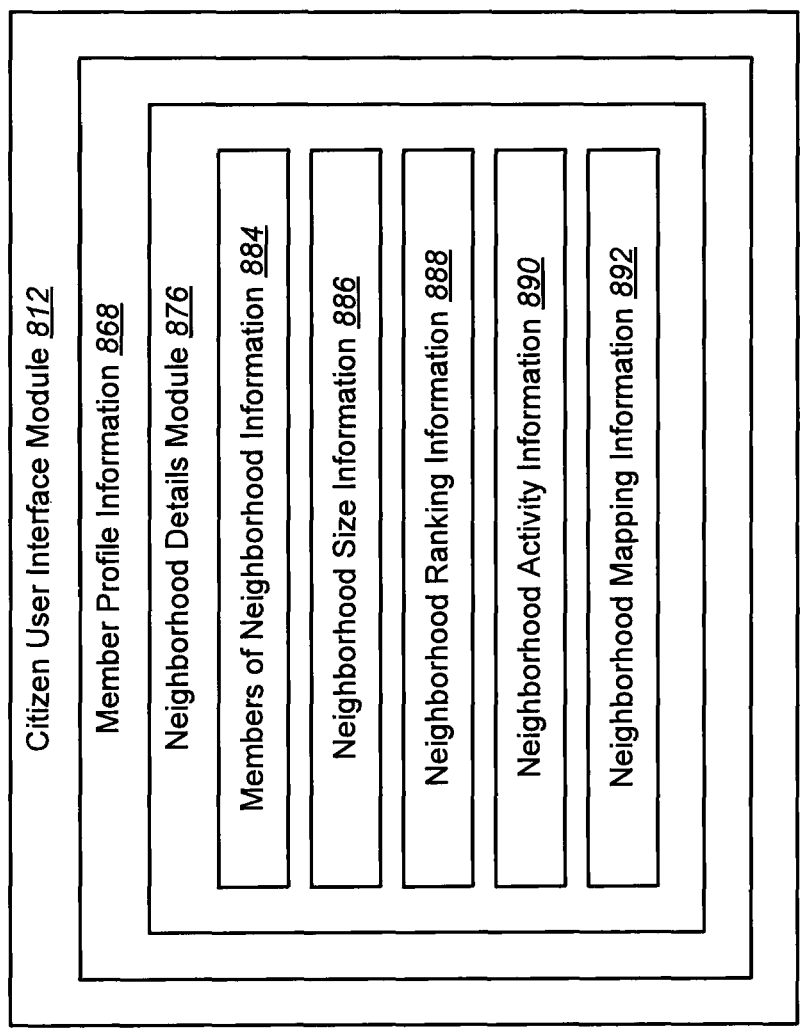
FIG. 8 is a block diagram illustrating one embodiment of a neighborhood details module.

FIG. 8 is a block diagram illustrating one embodiment of a neighborhood details module 876. As previously explained, the details module 876 may be part of member profile information 868 that is included as part of a citizen user interface module 812. The information provided by the neighborhood details module 876 may be displayed with a user clicks or selects a specific neighborhood.

In one configuration, the details module 876 may be include members of neighborhood information 884. This information 884 may provide the number of users who have joined the selected neighborhood. Neighborhood size information 886 may display the size of the neighborhood. The size of the neighborhood may be calculated from the shape boundaries of the neighborhood. Ranking information 888 may indicate a ranking for the selected neighborhood. For example, a higher ranking may be assigned to the neighborhood based on a high level of activity (crime events being reported, etc.) for the neighborhood.

The details module 876 may further include neighborhood activity information 890. This information may indicate the number of specific activities performed by member of a selected neighborhood as well as the number of all crimes within the neighborhood boundaries during a certain time period, such as a week, month, year, etc. In addition, the details module 876 may include neighborhood mapping information 892. The mapping information 892 may include a map that displays the neighborhood at a level where the entire shape of the neighborhood fits within a viewport and is zoomed in close enough that the neighborhood shape occupies the viewport. The map may also display pins or other indicators at the addresses of members of the neighborhood.

Figure 9:
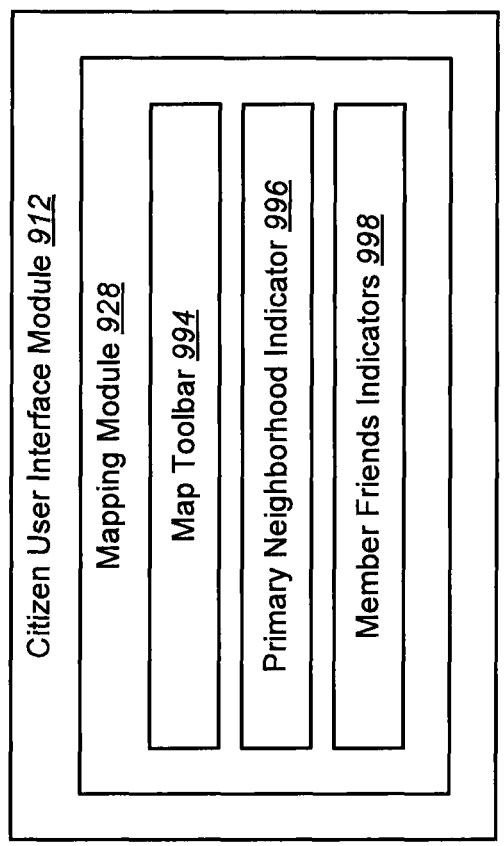
FIG. 9 is a block diagram illustrating another embodiment of a citizen user interface module.

FIG. 9 is a block diagram illustrating another embodiment of a citizen user interface module 912. As previously explained, the user interface module 912 may include a mapping module 928. The mapping module 928 may include a map toolbar 994, a primary neighborhood indicator 996, and a member friends indicator 998. In one embodiment, when a user logs into the reporting application 108 via the citizen user interface module 912, a map of a particular neighborhood may be displayed by the mapping module 928. The map toolbar 994 may display various functions to the user. For example, the toolbar 994 may allow the user to specify the type of information that is displayed on the map. As an example, the user may select the types of events, such as crimes, that are displayed on the map. The toolbar 994 may also allow the user to provide a specific address to locate on the map.

The primary neighborhood indicator 996 may indicate to the user that the neighborhood currently being displayed is the neighborhood selected by the user. The map may also display member friends indicators 998 that indicate the location of the user's contacts on the map. The user may click on a member friends indicator 998 and detailed information (e.g., name, address, recent activity, etc.) for the member's friend may be displayed.

If a user has not successfully logged into the reporting application 108, the map may display the user's local area as determined by Internet Protocol address lookup (IP-Lookup). If crimes are not displayed on the map in the user's area, the map may display a nearby city that is displaying the occurrence of crimes.

In areas where there is no crime, a message may be displayed informing the user that there is no crime in the area. The user may have the option to request data (e.g., crime updates, alerts, etc.) with or without entering their email address, phone number, or other contact information.

In one embodiment, a user may access a "participating agencies nearby" link on the map. Accessing the link may cause a list to be displayed of nearby agencies providing data to the reporting application 108. This list may display a certain number of agencies that are geographically closest to the center-point of the area in the viewport of the map. The displayed agency names may be hyperlinks. If a hyperlink is clicked, the map may display the location of the agency at the center-point of the viewport of the map.

In one embodiment, each event that occurs in the area displayed on the map may be marked on the map by an appropriate pin, icon, etc. based on the type of event. The user may single-click on a pin and a message may be displayed with details for the specific event. The user may also single-click on a multi-event pin and a message may be displayed with a list of events and the details for each event. The user may send a link for a particular event to another user. The other user may then access the details of the event.

Figure 10:
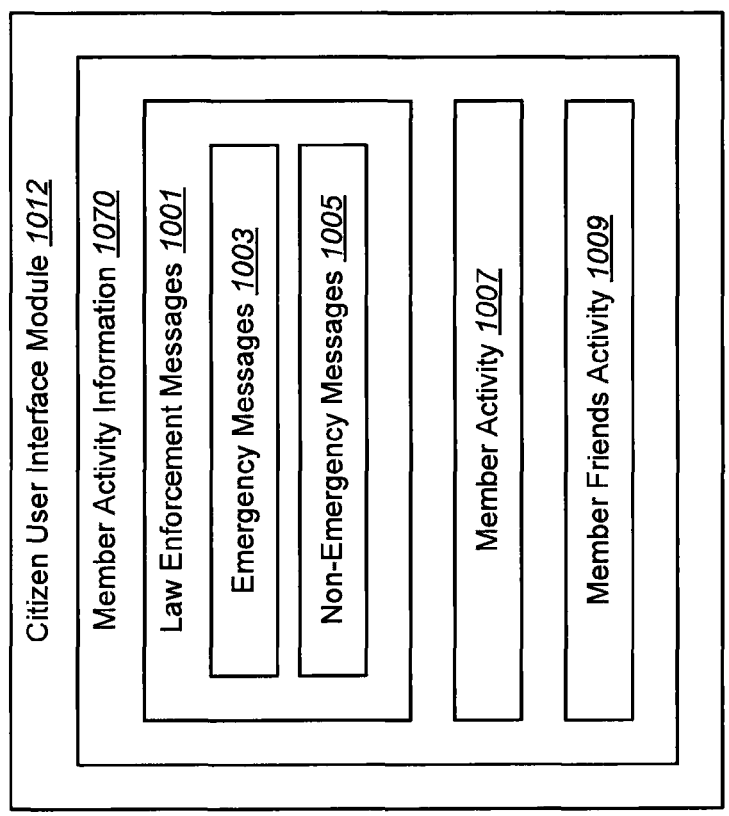
FIG. 10 is a block diagram illustrating another embodiment of a citizen user interface module that includes member activity information.

FIG. 10 is a block diagram illustrating another embodiment of a citizen user interface module 1012 that includes member activity information 1070. In one embodiment, the member activity information 1070 may display relevant activity about the logged in user and the user's friends and neighbors, as well as messages from local agencies. The member activity information 1070 may be a list that includes messages from agency users, such as members of a local enforcement agency, members of the neighborhood, and direct messages from friends.

The member activity information 1070 may include law enforcement messages 1001. These messages 1001 may be sent from a law enforcement agency. The messages 1001 may be identified as an emergency message 1003 or a non-emergency message 1005. Messages sent from a member of a law enforcement agency that are emergency messages 1003 may be associated with a particular icon. For example, emergency messages 1003 may be associated with a red shield icon. The message may include a hyperlink to a message center that displays details of the message Non-emergency messages 1005 may display an identifier (e.g., photo, icon, and the like) of the user associated with the law enforcement agency who sent the message. In addition, if the message 1005 was sent from the agency and not an individual user, the message 1005 may be associated with an icon or other type of identifier for the agency. The message 1005 may also include a hyperlink to the message center to display details of the message.

The information 1070 may also display member friends activity 1009 that includes activities associated with neighbors and friends. The member friend activity 1009 may display the most recent activity at the top of a list and as new messages come through they may appear at the top and the rest of the message may move down, with the bottom message ceasing to be displayed. The member friends activity 1009 may also display recent achievements of the logged in user's friends and neighbors.

Figure 11:
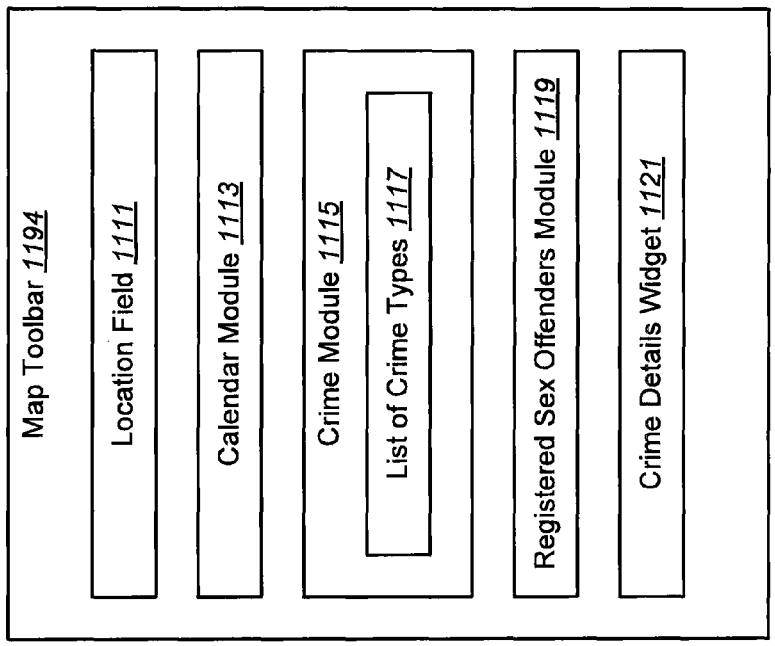
FIG. 11 is a block diagram illustrating a further embodiment of a map toolbar that may be included on a map displaying a particular neighborhood.

FIG. 11 is a block diagram illustrating a further embodiment of a map toolbar 1194 that may be included on a map displaying a particular neighborhood. In one configuration, the toolbar 1194 may include a location field 1111. A user may enter an address or other type of location identifier into the field 1111. The display of the map may shift so that the entered location identifier is displayed in the center of the map. The toolbar 1194 may also include a calendar module 1113 that may allow a user to specify a date range for events that have occurred. For example, the user may specify a certain time period via the calendar module 1113 and indicators of crimes that have occurred during this time period may be displayed on the map.

In one configuration, the toolbar 1194 may also include a crime module 1115. A user may access the crime module 1115 and view a list of crime types 1117. The user may then select one or more crime types that he/she would like to receive an alert for should that particular crime occur in a neighborhood in which the user belongs. A registered sex offenders module 1119 may be accessed to allow the user to specify whether or not indicators that identify registered sex offenders should be displayed on the map. A crime details widget 1121 may also be provided as part of the map toolbar 1194. The widget 1121 may be activated to display an overall summary of crime activity for a particular neighborhood displayed on the map. The widget 1121 may alternate between crime details and trends. When crime details are displayed, a button labeled "Trends" may be visible. When trends are displayed a button labeled "Details" may be visible.

In one embodiment, the crime details view may display the crime data list for the crimes that fall within the viewport window of the map. In one configuration, the trends (e.g., charts, analytics, statistics, etc.) view may display the one or more charts of events that occur within the viewport window of the map. The charts of events may include data such as the number of crimes, crime as a percentage of total crime, and crime trend. The data displayed in the charts may be constrained by the viewport of the map. Each chart may include a link to allow the user to see a full size image of the chart.

Figure 12:
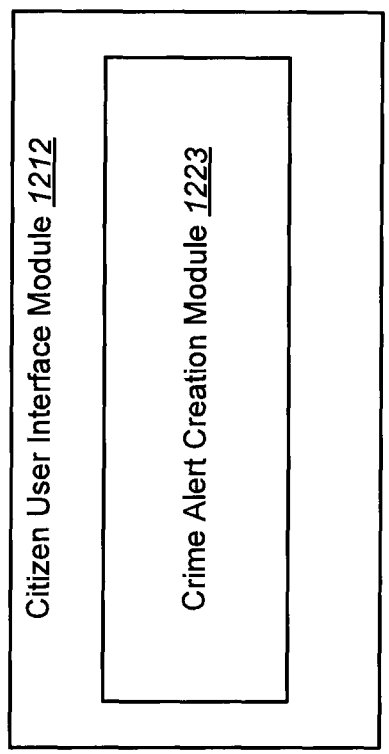
FIG. 12 is a block diagram illustrating another embodiment of a citizen user interface module.

FIG. 12 is a block diagram illustrating another embodiment of a citizen user interface module 1212. The module 1212 may include a crime alert creation module 1223. In one configuration, when a user logs into the reporting application 108, the user may have an option to manage alerts. Alerts may be messages received from a law enforcement agency when a particular event has occurred in an area (such as a neighborhood) designated by the user. The alerts may be sent via email, SMS messaging, and the like. In one embodiment, the user may select the area for which he/she will receive their alerts from a map. Crime types and frequency of alerts may be selected. The crime types may include, but are not limited to, homicide, breaking and entering, robbery, theft, theft of vehicle, theft from vehicle, sexual offense, and assault. The crime data (such as icons or other type of identifier) for the selected crime types appear on the map, and the data displayed on the map may change as the user selects different crime types or a different frequency. The user may select to receive registered sex offenders alerts.

In one example, alerts may be sent at the frequency selected (daily, weekly, monthly, and the like). Daily alerts may include data from the previous day. Weekly alerts may include data from the previous seven days. Monthly alerts may be sent on the same date of each month. For example, if a user signs up for an alert on the 15th of the month, the first alert may include incidents from the 15th of the previous month through the 14th of the current month (the day before the user signed up). The user may receive the next alert on the 15th of the next month, and the alert may include incidents from the 15th of the current month (the day the user signed up) through the 14th of the next month.

The alert messages may include the list of crime types that were selected by the user, with a number that represents the number of occurrences of that type of crime. The alert messages may also indicate the total number of incidents that have occurred in a particular neighborhood. The alert messages may also include a list of crimes that have occurred in the time frame that the alert covers, as well as new registered sex offenders in the area for the time frame. For example, a daily alert that a user receives today may include incidents that occurred yesterday.

Figure 13:
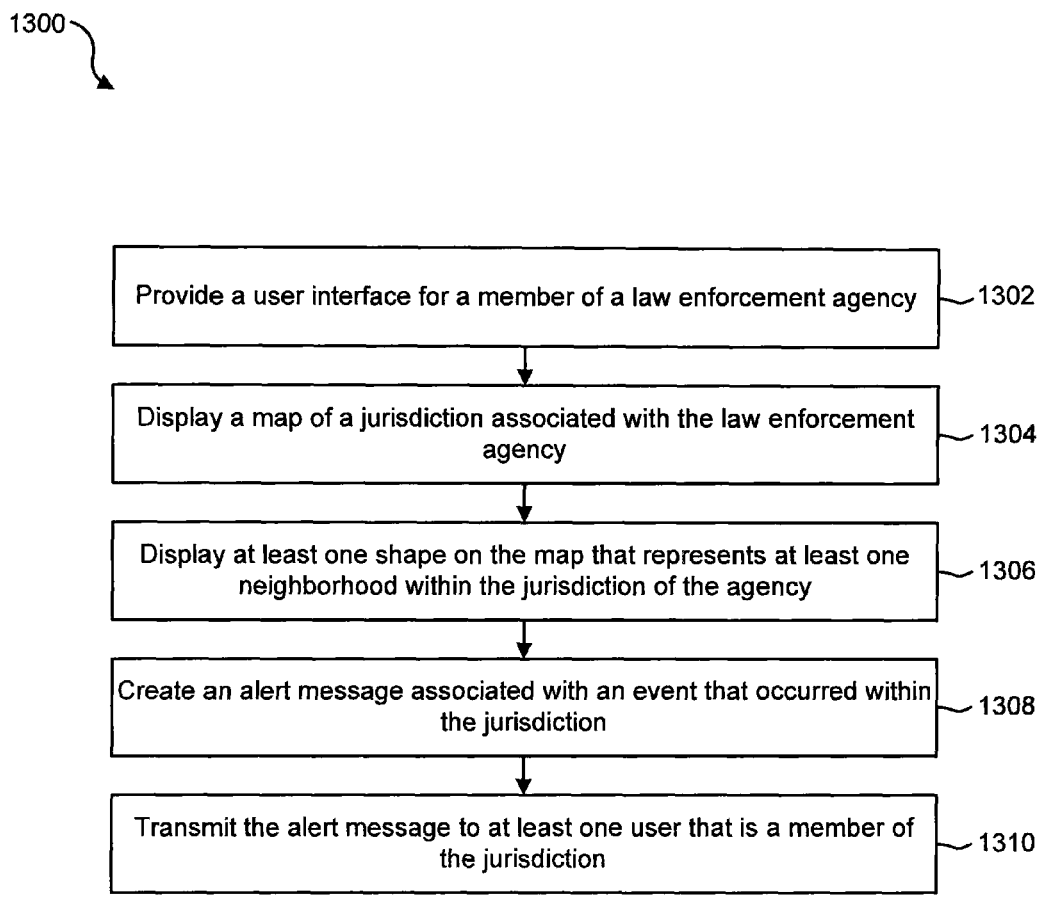
FIG. 13 is a flow diagram illustrating one embodiment of a method for generating alert messages to send from a law enforcement agency to one or more users belonging to a neighborhood in which an event occurred.

FIG. 13 is a flow diagram illustrating one embodiment of a method 1300 for generating alert messages to send from a law enforcement agency to one or more users belonging to a neighborhood in which an event occurred. In one configuration, a user interface for a member of a law enforcement agency may be provided 1302. A map of a jurisdiction associated with the law enforcement agency may be displayed 1304. In one embodiment, at least one shape may be displayed on the map 1306 that represents at least one neighborhood within the jurisdiction of the agency. An alert message associated with an event that occurred within the jurisdiction may be created 1308. In one example, the alert message may be transmitted 1310 to at least one user that is a member of the jurisdiction of the law enforcement agency.

Figure 14:
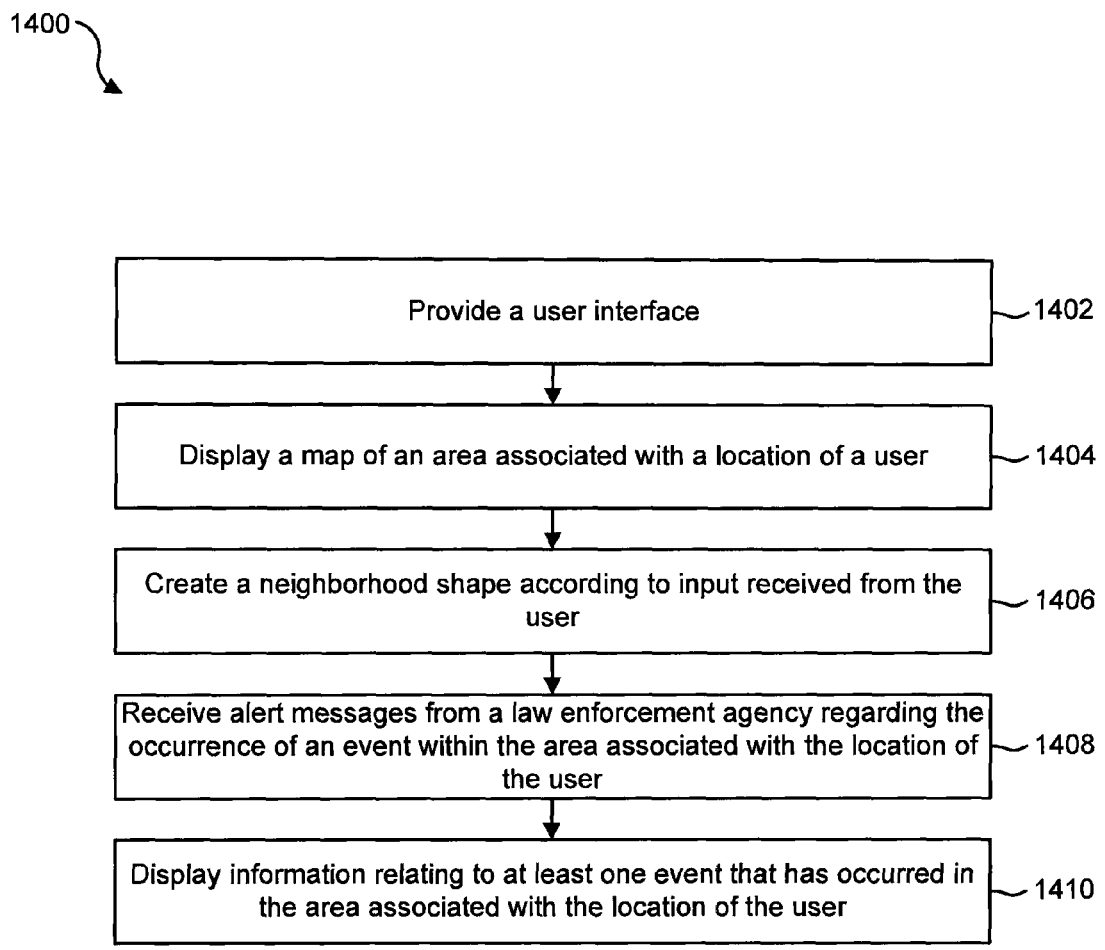
FIG. 14 is a flow diagram illustrating one embodiment of a method for providing a user interface for a citizen to receive and generate alerts relating to events occurring in a particular neighborhood.

FIG. 14 is a flow diagram illustrating one embodiment of a method 1400 for providing a user interface for a citizen to receive and generate alerts relating to events occurring in a particular neighborhood. In one example, a user interface is provided 1402. A map of an area associated with a location of a user may be displayed 1404. A neighborhood shape may be created 1406 according to input received from the user. In one configuration, alert messages may be received 1408 from a law enforcement agency. The alert messages may be regarding the occurrence of an event within the area associated with the location of the user. Information relating to at least one event that has occurred in the area associated with the location of the user may be displayed 1410 on the map.

Figure 15:
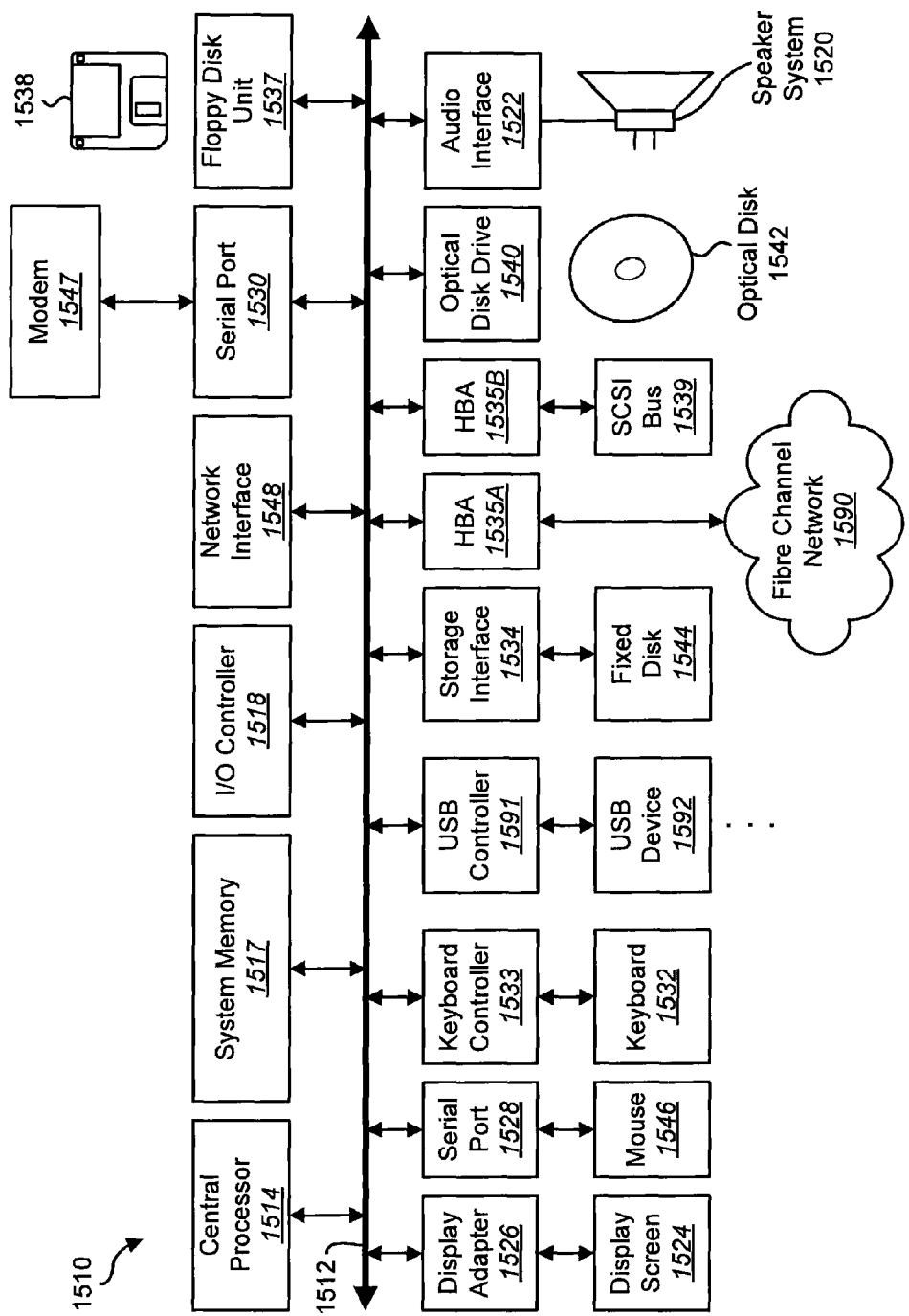
FIG. 15 depicts a block diagram of a computer system suitable for implementing the present systems and methods.

FIG. 15 depicts a block diagram of a computer system 1510 suitable for implementing the present systems and methods.

Computer system 1510 includes a bus 1512 which interconnects major subsystems of computer system 1510, such as a central processor 1514, a system memory 1517 (typically RAM, but which may also include ROM, flash RAM, or the like), an input/output controller 1518, an external audio device, such as a speaker system 1520 via an audio output interface 1522, an external device, such as a display screen 1524 via display adapter 1526, serial ports 1528 and 1530, a keyboard 1532 (interfaced with a keyboard controller 1533), multiple USB devices 1592 (interfaced with a USB controller 1590), a storage interface 1534, a floppy disk drive 1537 operative to receive a floppy disk 1538, a host bus adapter (HBA) interface card 1535A operative to connect with a Fibre Channel network 1590, a host bus adapter (HBA) interface card 1535B operative to connect to a SCSI bus 1539, and an optical disk drive 1540 operative to receive an optical disk 1542. Also included are a mouse 1546 (or other point-and-click device, coupled to bus 1512 via serial port 1528), a modem 1547 (coupled to bus 1512 via serial port 1530), and a network interface 1548 (coupled directly to bus 1512).

Bus 1512 allows data communication between central processor 1514 and system memory 1517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. Applications resident with computer system 1510 are generally stored on and accessed via a computer readable medium, such as a hard disk drive (e.g., fixed disk 1544), an optical drive (e.g., optical drive 1540), a floppy disk unit 1537, or other storage medium. Additionally, applications can be in the form of electronic signals modulated in accordance with the application and data communication technology when accessed via network modem 1547 or interface 1548.

Storage interface 1534, as with the other storage interfaces of computer system 1510, can connect to a standard computer readable medium for storage and/or retrieval of information, such as a fixed disk drive 1544. Fixed disk drive 1544 may be a part of computer system 1510 or may be separate and accessed through other interface systems. Modem 1547 may provide a direct connection to a remote server via a telephone link or to the Internet via an internet service provider (ISP). Network interface 1548 may provide a direct connection to a remote server via a direct network link to the Internet via a POP (point of presence). Network interface 1548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 15 need not be present to practice the present systems and methods. The devices and subsystems can be interconnected in different ways from that shown in FIG. 15. The operation of a computer system such as that shown in FIG. 15 is readily known in the art and is not discussed in detail in this application. Code to implement the present disclosure can be stored in computer-readable medium such as one or more of system memory 1517, fixed disk 1544, optical disk 1542, or floppy disk 1538. The operating system provided on computer system 1510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 16:
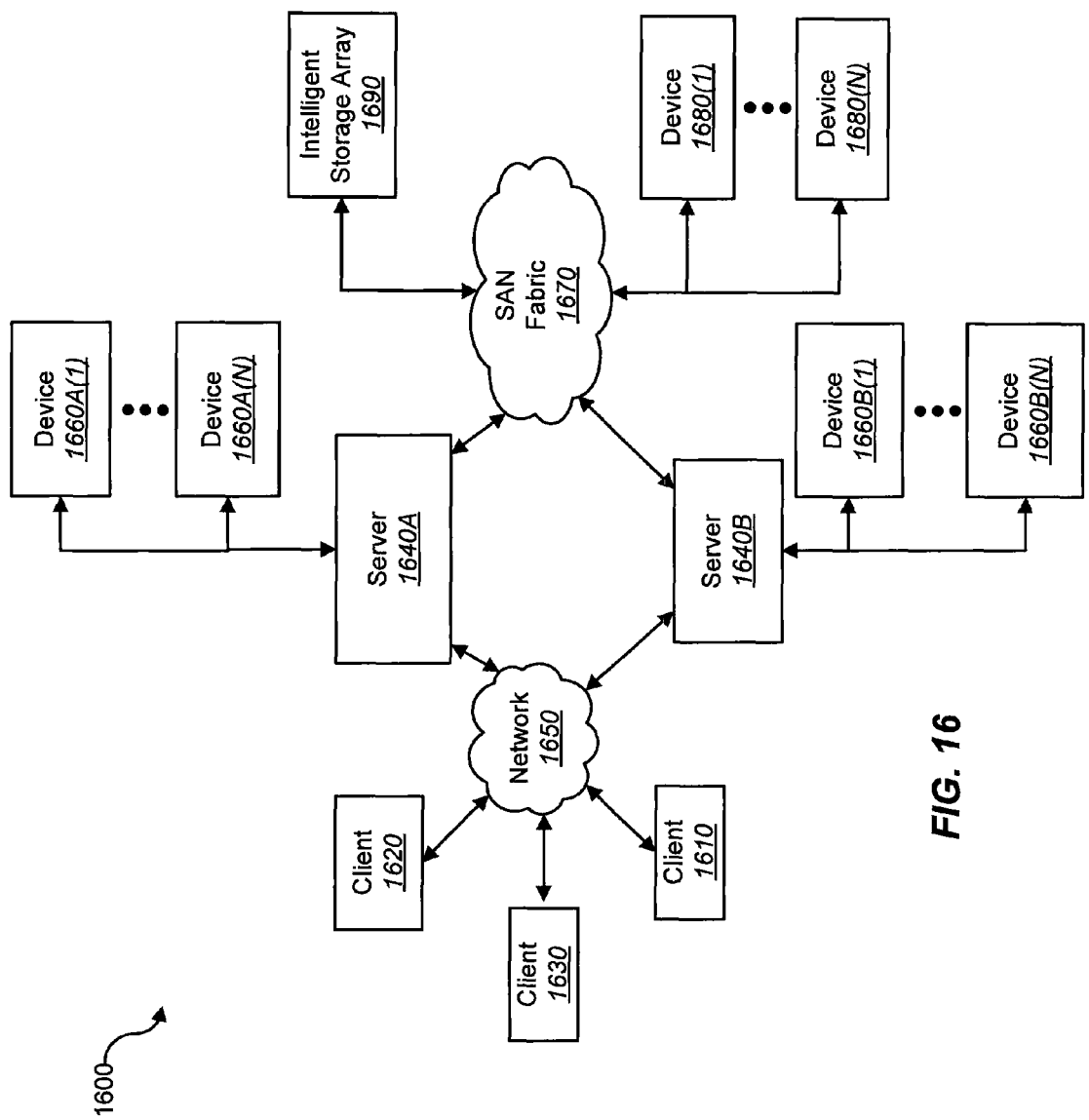
FIG. 16 is a block diagram depicting a network architecture in which client systems, as well as storage servers (any of which can be implemented using computer system), are coupled to a network.

FIG. 16 is a block diagram depicting a network architecture 1600 in which client systems 1610, 1620 and 1630, as well as storage servers 1640A and 1640B (any of which can be implemented using computer system 1610), are coupled to a network 1650. The storage server 1640A is further depicted as having storage devices 1660A(1)-(N) directly attached, and storage server 1640B is depicted with storage devices 1660B(1)-(N) directly attached. SAN fabric 1670 supports access to storage devices 1680(1)-(N) by storage servers 1640A and 1640B, and so by client systems 1610, 1620 and 1630 via network 1650. Intelligent storage array 1690 is also shown as an example of a specific storage device accessible via SAN fabric 1670.

With reference to computer system 1510, modem 1547, network interface 1548 or some other method can be used to provide connectivity from each of client computer systems 1610, 1620, and 1630 to network 1650. Client systems 1610, 1620, and 1630 are able to access information on storage server 1640A or 1640B using, for example, a web browser or other client software (not shown). Such a client allows client systems 1610, 1620, and 1630 to access data hosted by storage server 1640A or 1640B or one of storage devices 1660A(1)-(N), 1660B(1)-(N), 1680(1)-(N) or intelligent storage array 1690. FIG. 16 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for receiving alert messages relating to events that occur within a pre-defined area, comprising:
providing a user interface to a reporting application;
displaying a map associated with a location of a user;
creating a neighborhood according to input received from the user via the user interface;
receiving an alert message regarding an occurrence of an event within the neighborhood; and
displaying information on the map that relates to the location of the occurrence of the event, wherein the information comprises two or more of a size of the neighborhood; a population of the neighborhood; a number of events within the neighborhood; a categorization of events within the neighborhood; a rate of events within the neighborhood; and a ranking of the neighborhood.

2. The method of claim 1, wherein the alert message is received as a short messaging service (SMS) message.

3. The method of claim 1, wherein the alert message is received as an electronic mail message.

4. The method of claim 1, wherein the alert message comprises an identifier to identify the alert message as an emergency message.

5. The method of claim 1, wherein the alert message comprises an identifier to identify the alert message as a non-emergency message.

6. The method of claim 1, further comprising receiving a verification for the user from a second user.

7. The method of claim 1, wherein the occurrence of the event indicates an occurrence of a crime within the boundaries of the neighborhood.

8. The method of claim 1, further comprising sending a tip relating to the occurrence of an event.

9. The method of claim 8, wherein the tip is sent as an SMS message.

10. The method of claim 8, wherein the tip is sent to a member of a law enforcement agency.

11. A computing device configured to receive alert messages relating to events that occur within a pre-defined area, comprising:
   a processor;
   memory in electronic communication with the processor;
   a user interface module configured to:
      display a map associated with the location of a user;
      create a neighborhood according to input received from the user via the user interface;
      receive an alert message regarding an occurrence of an event within the neighborhood; and
      display information on the map that relates to the location of the occurrence of the event, wherein the information comprises two or more of a size of the neighborhood; a population of the neighborhood; a number of events within the neighborhood; a categorization of events within the neighborhood; a rate of events within the neighborhood; and a ranking of the neighborhood.

12. The computing device of claim 11, wherein the alert message is received as a short messaging service (SMS) message.

13. The computing device of claim 11, wherein the alert message is received as an electronic mail message.

14. The computing device of claim 11, wherein the alert message comprises an identifier to identify the alert message as an emergency message.

15. The computing device of claim 11, wherein the alert message comprises an identifier to identify the alert message as a non-emergency message.

16. The computing device of claim 11, further comprising receiving a verification for the user from a second user.

17. The computing device of claim 11, wherein the occurrence of the event indicates an occurrence of a crime within the boundaries of the neighborhood.

18. The computing device of claim 11, further comprising sending a tip relating to the occurrence of an event.

19. The computing device of claim 18, wherein the tip is sent as an SMS message.

20. A computer-program product for receiving alert messages relating to events that occur within a pre-defined area, the computer-program product comprising a computer-readable medium having instructions thereon, the instruction comprising:
   code programmed to provide a user interface to a reporting application;
   code programmed to display a map associated with the location of a user;
   code programmed to create a neighborhood according to input received from the user via the user interface;
   code programmed to receive an alert message regarding an occurrence of an event within the neighborhood; and
   code programmed to display information on the map that relates to the location of the occurrence of the event, wherein the information comprises two or more of a size of the neighborhood; a population of the neighborhood; a number of events within the neighborhood; a categorization of events within the neighborhood; a rate of events within the neighborhood; and a ranking of the neighborhood.

* * * * *